March 2, 1965 G. ALESBURY 3,171,619
AIRCRAFT UNDERCARRIAGES
Filed Dec. 9, 1963 4 Sheets-Sheet 1
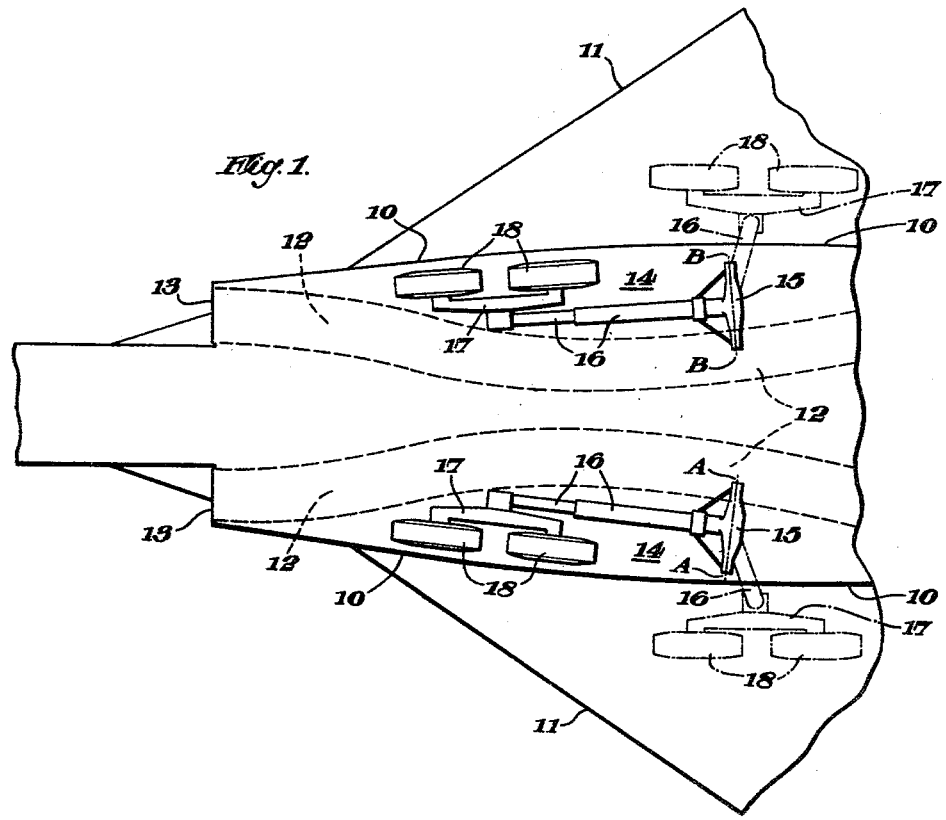
Inventor
George Alesbury
By
Nolte & Nolte
Attorneys

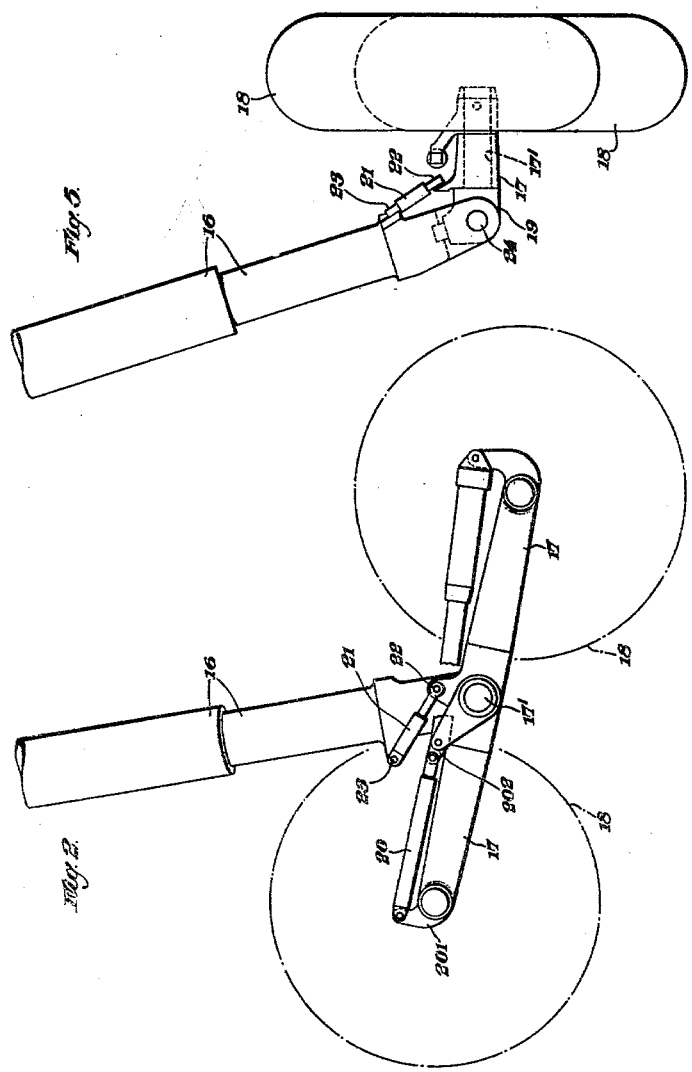

March 2, 1965 G. ALESBURY 3,171,619
AIRCRAFT UNDERCARRIAGES
Filed Dec. 9, 1963 4 Sheets-Sheet 3
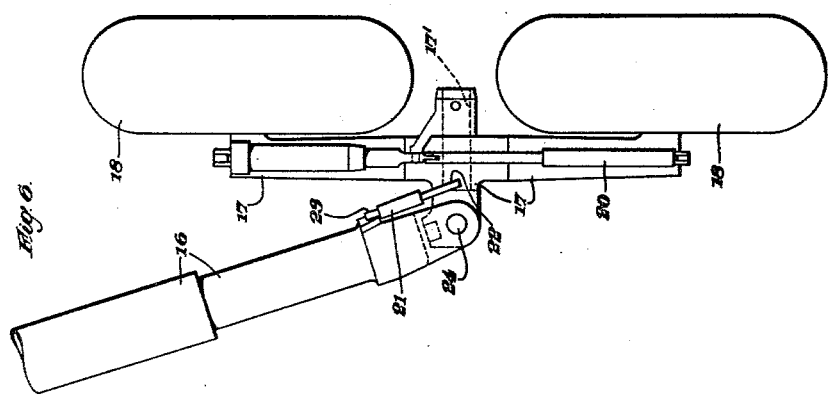
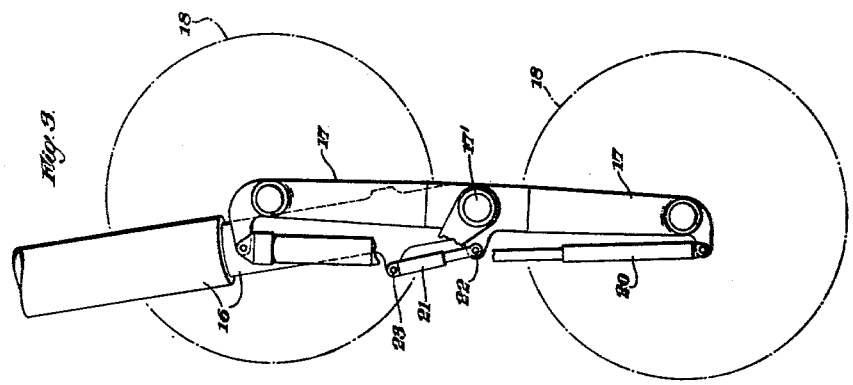
Inventor
George Alesbury
By
Nolte + Nolte
Attorneys March 2, 1965  G. ALESBURY  3,171,619
AIRCRAFT UNDERCARRIAGES
Filed Dec. 9, 1963  4 Sheets-Sheet 4
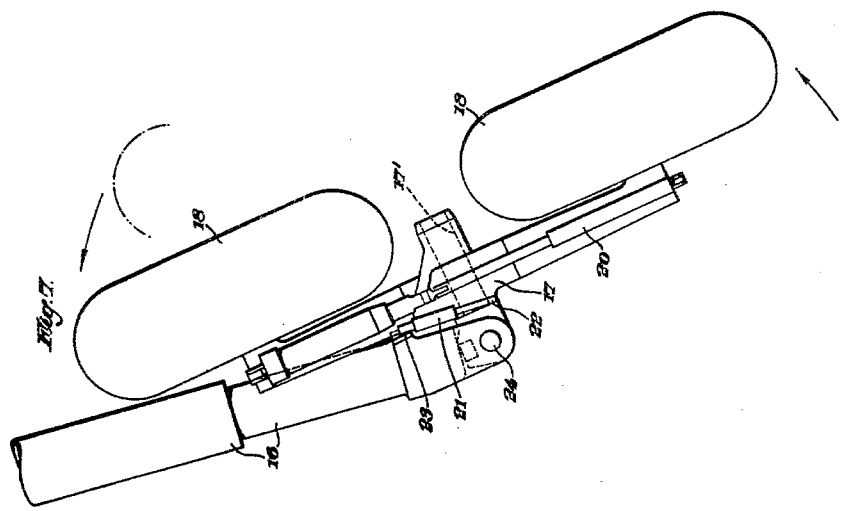
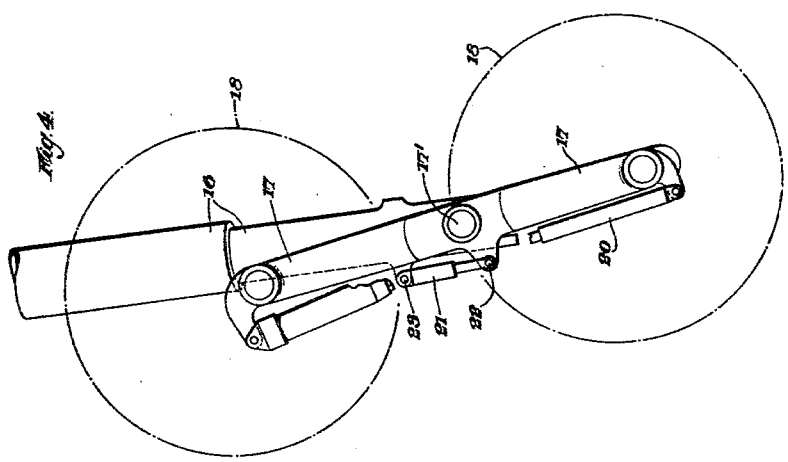
Inventor
George Alesbury
By Nolte & Nolte
Attorneys United States Patent Office 3,171,619
Patented Mar. 2, 1965

3,171,619
AIRCRAFT UNDERCARRIAGES
George Alesbury, Walton-on-Thames, Surrey, England, assignor to Vickers-Armstrongs (Aircraft) Limited, London, England, a British company
Filed Dec. 9, 1963, Ser. No. 328,934
Claims priority, application Great Britain, Dec. 11, 1962, 46,823/62
5 Claims. (Cl. 244—102)

This invention has for its object to provide an improved form of main under-carriage for aircraft of the kind in which the under-carriage is retractable during flight for stowage in closely restricted housing space within the fuselage or elsewhere, and in which the landing element is in the nature of a bogie incorporating a beam mounted at the extremity of the under-carriage leg. For this purpose the invention provides, in respect of each unit of the main under-carriage, an arrangement whereby during retraction and extension of the under-carriage leg, the landing element bogie is caused to execute consecutively two rotational movements in relation to said leg, viz. (a) a movement about an axis substantially parallel to the longitudinal axis of the aircraft, and (b) a movement about an axis parallel to the transverse axis of the aircraft. (N.B. The expression "landing element" is to be understood as meaning a conventional arrangement of bogie carrying two or more wheels in tandem, a skid, or a caterpillar track assembly.)

It is characteristic of under-carriages in which the mountings are included within the fuselage envelope and which are arranged for stowage inside said envelope, that the width of the track of the under-carriage landing elements is appreciably greater than the lateral distance between the mountings of the respective legs. Such an arrangement is desirable to afford adequate ground stability. For this reason the under-carriage legs are splayed outwardly from the vertical in a transverse direction, and this invention is therefore more particularly—though not exclusively—concerned with under-carriages possessing this characteristic. In such cases, the first of the aforementioned rotational movements of the landing element will be between an operational position in which the bogie assumes a vertical position to a stowage position in which the bogie is substantially parallel to the transversely inclined leg, and vice versa.

An embodiment of the invention, as applied to an aeroplane in which the under-carriage units are stowed when retracted in housings within the fuselage at opposite sides thereof, is illustrated in the accompanying drawings, reference to which is made in the following detailed description. In said drawings FIG. 1 is a diagrammatic plan view of the parts of an aeroplane in the region of the main under-carriage, the separate units of which are shown in full lines in their fully retracted condition and in chain-dotted lines in their extended condition. FIG. 2 is a side view of the landing element of one of the under-carriage units shown in the extended condition in readiness for landing. FIG. 3 is a similar view to FIG. 2 of the same element as seen after it has executed the first rotational movement preparatory to retraction. FIG. 4 is a similar view of the landing element showing the position of the bogie after executing a rotational movement about an axis parallel to the longitudinal axis of the aircraft. FIGS. 5, 6 and 7 are rear elevations of the landing element in the positions respectively illustrated in FIGS. 2, 3 and 4.

In FIG. 1 the centre portion of an aeroplane fuselage is indicated at 10, 10 and the leading edges of swept wings are shown at 11, 11. The accommodation within the envelope of the fuselage 10 which is available for housing the main under-carriage units when retracted is greatly restricted by the presence in the fuselage of longitudinal air ducts 12, 12 which extend aftwards between forward situated intakes 13, 13, one on either side of the fuselage, and rearwardly situated gas turbine propulsive engines (not shown), to the comparatively small spaces indicated at 14, 14.

Each of the main under-carriage units as shown includes a bracket 15 by which an oleo leg 16 is pivoted on the air-frame, a bogie beam 17 which is pivoted on a pin 17' at approximately its mid-point on the outer end of the leg 16 with capability of movement about an axis substantially parallel to the transverse axis of the aircraft, and at each end of the beam 17 is a carrying wheel 18. The under-carriage units are respectively mounted by the said brackets 15 within said spaces 14, 14 for pivotal movement about axes denoted by the lines A—A and B—B (FIG. 1), which axes are so arranged that in the extended condition of the under-carriage units each leg 16 occupies an outwardly declined position affording a wide wheel track for ground stability.

On retraction, each leg 16 rotates about its axis A—A or B—B and moves forwardly and inwardly until the whole unit is enclosed within the relative compartment 14, remaining clear of the adjacent duct 12. To achieve this arrangement the following constructional features are provided.

The bogie beam pivot pin 17' of each unit is mounted upon the end of the leg 16 by means of a bracket 19, in such manner that the beam 17 is capable of movement about a transverse axis, thereby permitting the bogie to be moved at the commencement of retraction in an anticlockwise direction as viewed in FIG. 2 from its normal operative position parallel to the ground to a generally vertically vertical stowage position (as shown in FIG. 4), a position in relation to the leg which it retains when housed within the compartment 14. Such movement of the bogie beam is effected by means of a fluid-pressure jack 20 having one element connected to a bracket 201 fixed on the end of the beam 17, and the other part linked to a bracket 202 which is mounted on the pin 17'. Means are provided for locking the bogie beam in either of said positions.

FIGS. 2 and 5 show the landing element in the attitude which it adopts in readiness for landing, with the bogie inclined forwardly at the correct trail angle. This position is resumed at take-off after the load of the aircraft has become airborne. When the under-carriage retracting mechanism is set in operation to retract the under-carriage the hydraulic jack 20 is energised so as to rotate the bogie beam 17 about the pin 17' to the position shown in FIGS. 3 and 6, in which the strut 21, which is pivotally connected to the beam 17 at 22 and to the leg 16 at 23, is at its extreme extension.

On reaching the position shown in FIGS. 3 and 6, the point 22 is prevented from moving further relative to the lower part of the leg 16, and the continued rotation of the beam 17 about the pin 17' is effected to tilt the pin 17' about the axis 24, causing the bogie to assume the position shown in FIGS. 4 and 7.

The bogie is now locked in the attitude in which it leans inwardly so as to be substantially parallel to the leg 16, and the whole unit rotates forwardly about its axis A—A or B—B, until it reaches the fully stowed position within the compartment 14, where it is locked against displacement during flight.

What I claim as my invention and desire to secure by Letters Patent is:

1. An aeroplane, comprising a fuselage, two transversely spaced compartments in said fuselage, and under-carriage means including at each side of the aircraft an oleo leg and a landing element carried by said oleo leg, means for mounting said oleo leg for pivotal movement between positions in which the landing element occupies respectively a stowed position within one of said compartments and an extended operative position, said landing element comprising a bogie, means mounting the bogie on the oleo leg for rotational movement thereon about longitudinal and transverse axes respectively, and means connecting the bogie to the leg for rotating said bogie, on movement of the leg towards the stowed position, first about one of said axes and subsequently about the other of said axes and for rotating said bogie, on movement of the leg towards the operative position, first about said other axis and subsequently about said one axis.

2. An aeroplane as claimed in claim 1, wherein the means for mounting the oleo leg for pivotal movement supports the latter for turning movement exclusively about a generally transverse axis to its operative position where it is splayed outwardly from the vertical in a transverse direction, and wherein the rotational movements of the bogie on the leg about the transverse axis are effective to tilt the bogie into a laterally inclined position generally parallel to the leg.

3. An aeroplane as claimed in claim 1, wherein the means mounting the bogie on the leg includes, on the extremity of the oleo leg, a bracket pivotable on the leg about a longitudinal axis, upon which bracket the bogie is pivotable about a transverse axis, and said means for rotating said bogie about said axes comprising fluid-pressure means for rotating the bogie about said transverse axis and a connection means between the bogie and the leg temporarily limiting relative movement therebetween in a predetermined direction for preventing, in the last stage of said pivotal movement of the bogie about the transverse axis on the retraction of the under-carriage to the stowed position and in the first stage of said pivotal movement of the bogie about the transverse axis on the extension of the under-carriage, rotation of the bogie about said transverse axis and forcing the bogie instead to execute a lateral tilting motion about said longitudinal axis.

4. An aeroplane as claimed in claim 3, wherein said fluid-pressure means is a hydraulic jack mounted on the bogie with its movable element connected to the oleo leg.

5. An aeroplane as claimed in claim 3, wherein said connection means includes an extensible strut coupled at opposite extremities to the bogie and to the oleo leg for constraining the rotation of the bogie about the longitudinal axis due to said strut to occur only when, in the rotational movement of the bogie about the transverse axis, the bogie passes a position in which the strut is at its full extension.

References Cited by the Examiner

UNITED STATES PATENTS 2,869,806  1/59  Beach _____ 244—102

MILTON BUCHLER, *Primary Examiner.*

ANDREW H. FARRELL, *Examiner.*